United States Patent [19]

Penton

[11] Patent Number: 4,514,550

[45] Date of Patent: Apr. 30, 1985

[54] POLYPHOSPHAZENE PROCESS

[75] Inventor: Harold R. Penton, Baton Rouge, La.

[73] Assignee: Ethyl Corporation, Richmond, Va.

[21] Appl. No.: 608,653

[22] Filed: May 9, 1984

[51] Int. Cl.$^3$ .............................................. C08G 79/04
[52] U.S. Cl. ................................... 525/538; 528/167; 528/169
[58] Field of Search ................. 525/538; 528/167, 169

[56] References Cited

U.S. PATENT DOCUMENTS

| | | | |
|---|---|---|---|
| 4,357,458 | 11/1982 | Antkowiak et al. | 528/212 |
| 4,387,208 | 6/1983 | Allcock et al. | 525/538 |

FOREIGN PATENT DOCUMENTS 1135714  11/1982  Canada ................................ 525/538

Primary Examiner—Lester L. Lee
Attorney, Agent, or Firm—Donald L. Johnson; John F. Sieberth; Joseph D. Odenweller

[57] ABSTRACT

Phosphonitrilic chloride polymers are substituted with aryloxide or alkoxide groups by reaction with an alkali metal aryloxide or alkoxide in a single liquid hydrocarbon reaction medium, e.g. cyclohexane, toluene and the like, in which the aryloxides or alkoxides are essentially insoluble and in which the substituted product is soluble.

24 Claims, No Drawings

POLYPHOSPHAZENE PROCESS

BACKGROUND OF THE INVENTION

Polyphosphazenes are a class of polymers comprising a chain of

units in which n can range from 3 to 50,000 or higher. The properties of such polymers depends to a large extent on the nature of substituents on the phosphorus atom. One useful class of substituents are aryloxides. Such compositions are described in U.S. Pat. No. 3,853,794; U.S. Pat. No. 3,856,713 and U.S. 3,883,451. Another useful class of substituents comprises alkoxides, both substituted and unsubstituted. These polymers are also known in the art. The prior art makes substituted polphosphazenes by adding a solution of an alkali metal aryloxide or alkoxide generally in an ether solvent such as tetrahydrofuran to a solution of a phosphonitrilic chloride polymer in a different solvent such as benzene, toluene, xylene and the like. These prior art processes entail the use of two different solvents which require separate storage and handling facilities and the solvents cannot be used again in the same process until they are separated and purified by rectification. Thus, there is a major economic incentive to discover a substitution reaction which can be conducted using a single solvent system.

One single solvent process is described in U.S. Pat. No. 4,129,529 which represents a substantial advance in the polyphosphazene art. The requirements of the solvent are that all of the following must be soluble in the single solvent—(1) the phosphonitrilic halide polymer, (2) the alkali metal aryloxide or alkoxide and (3) the substituted polyphosphazene product. These criteria are disclosed to be satisfied by tetrahydrofuran.

Austin et al Macromolecule 16, p. 719–22 (1983) disclose the substitution of phosphonitrilic chloride polymers in a single solvent in which an alkali metal alkoxide or aryloxide would not normally be soluble. Austin et al circumvent this problem by adding a tetra-n-butyl ammonium chloride to the reaction mixture which converts the alkali metal alkoxide or aryloxide to a soluble tetra-n-butyl ammonium salt which migrates to the organic phase. Hence in the Austin et al system the alkoxides and aryloxides are not insoluble in the organic phase.

SUMMARY

It has now been discovered that substituted polyphosphazenes can be made by reacting a solution of a phosphonitrilic chloride polymer with a slurry of an alkali metal aryloxide or alkoxide in which both solvents are the same liquid hydrocarbon in which the resultant substituted polyphosphazene is soluble. It is surprising from what the prior art teaches that such a simple process would be operable because neither alkali metal alkoxide or aryloxide are appreciably soluble in hydrocarbons.

DESCRIPTION OF THE PREFERRED EMBODIMENTS

A preferred embodiment of the invention is a process for replacing the chloride substituent on a phosphonitrilic chloride polymer with a group selected from aryloxides, alkoxides, substituted aryloxides, substituted alkoxides and mixtures thereof in a single liquid reaction medium, said process comprising heating a mixture of said phosphonitrilic chloride polymer and a substituting agent selected from alkali metal aryloxides, alkoxides, substituted aryloxides, substituted alkoxides and mixtures thereof in a liquid hydrocarbon reaction medium in which said alkali metal aryloxides, alkoxides, substituted aryloxides, substituted alkoxides and mixtures thereof are substantially insoluble and the resultant substituted polymer is soluble, at a temperature of about 120–200° C. for a period of time sufficient to obtain a substantial amount of substituted polymer.

The phosphonitrilic chloride polymers can have a wide molecular weight range. On one end are the low molecular weight cyclic polymers such as phosphonitrilic chloride trimer, tetramer, pentamer and the like. Of somewhat higher molecular weight are the low molecular weight linear polymers containing about 7–20 [$PNCl_2$] units referred to herein as oligomers.

The most useful phosphonitrilic chloride polymers are the high molecular weight organic soluble linear polymers referred to as "chloropolymers". The chloropolymers contain in the range of about 50–50,000 or more —$PNCl_2$— units. These linear chloropolymers are soluble in many organic solvents including ethers, such as tetrahydrofuran, cycloaliphatic hydrocarbons such as cyclohexane and aromatic hydrocarbons such as benzene and toluene. This solubility distinguishes these linear polymers from the hard cross-linked polymers which are insoluble in such solvents.

Low molecular weight cyclic polymers can be made by the reaction of substantially equal mole amounts of $PCl_5$ and ammonium chloride in a solvent such as monochlorobenzene at a temperature of about 50°–220° C. Use of a stoichiometric excess of $PC_5$ in this reaction leads to the formation of oligomers. These oligomers in turn can be converted to high molecular weight chloropolymers by heating with ammonium chloride. One such process is discussed in U.S. Pat. No. 4,374,815.

A preferred method of making the high molecular weight linear chloropolymers is to heat purified (cf U.S. Pat. No. 4,175,113) phosphonitrilic chloride trimer at a temperature of about 200°–250° C. in an inert atmosphere for a period of about 24 hours. The polymerization rate can be increased by using a catalyst as disclosed in U.S. Pat. No. 3,917,802; U.S. Pat. No. 3,937,790; U.S. Pat. No. 4,005,171; U.S. Pat. No. 4,123,503; U.S. Pat. No. 4,139,598 or U.S. Pat. No. 4,226,840.

The alkali metal aryloxide, alkoxide, substituted aryloxide, substituted alkoxide or mixtures thereof are readily made by reacting the appropriate alcohol or aromatic hydroxy compound with an alkali metal or an alkali metal hydride in the solvent to be used in the substitution reaction. Alkoxides can be made from alcohols such as methanol, ethanol, n-propanol, n-butanol, iso-butanol, 2-ethylhexanol, n-dodecanol, sec-eicosanol and the like. The alcohols may also be substituted with groups that do not interfere with alkoxide formation or which will not react with the subsequently formed alkoxides. Useful substituents include methoxy, ethoxy and the like. Halogen substituted alcohols can also be used with care. Some reaction of the alkali metal with the halogen groups may occur so alkali metal or hydride should be added slowly as consumed in the reaction to prevent a runaway reaction.

Phenols and other hydroxy aromatics react readily with alkali metal or alkali metal hydrides to form alkali metal aryloxides or substituted aryloxides. Such hydroxy aromatics include phenol, o-cresol, p-cresol, m-cresol, m-ethylphenol, p-ethylphenol, p-tert-butylphenol, p-chlorophenol, 2,4-di-chlorophenol, 2,4-difluorophenol, p-trifluoromethylphenol, p-methoxyphenol, p-ethoxyphenol, p-butoxy- phenol, α-naphthol, β-naphthol and the like.

It is frequently desired to have curing sites on the resultant substituted polyphosphazene. A good way to accomplish this is to include allylphenoxides as a substituent group. These can be included by merely including allyl phenol in the aryloxide and/or alkoxide formation. Preferably, o-allylphenol is used. A useful range is that needed to substitute about 1–20% of the available P-Cl sites in the chloropolymer.

A very useful substitution mixture is a mixture of phenoxide and alkylphenoxide groups made from a mixture of phenol and alkylphenol. Preferred alkyl phenols are the p-alkyl phenols or mixtures of alkyl phenols containing a substantial amount of p-alkyl phenols. More preferably, the phenols are a mixture of about 30–70 mole percent phenol and 70–30 mole percent p-ethylphenol. To this can also be added sufficient o-allyl phenol to impart curing properties to the product.

Products having excellent physical properties have also been made from mixtures of phenol, alkylphenol and alcohols forming polyphosphazenes substituted with phenoxide, alkylphenoxide and alkoxide groups. Likewise, small amounts of o-allylphenol can be included to provide the desired curing properties.

Suitable hydrocarbon solvents include all hydrocarbons in which the phosphonitrilic chloride polymer and the resultant substituted polyphosphazene are soluble. A further requirement is that the alkali metal alkoxide, aryloxide, substituted alkoxide, substituted aryloxide or mixtures thereof are not appreciably soluble in the hydrocarbon solvent. Examples of these are the aromatic hydrocarbons such as benzene, toluene, xylene and the like and cycloaliphatic hydrocarbons such as cyclopentane, cyclohexane, cycloheptane, cyclooctane and the like. The preferred solvents are toluene and cyclohexane.

The aryloxide and alkoxide can be made by either adding an alkali metal or alkali metal hydride to a mixture of the solvent and the aromatic hydroxy compound and/or alcohol. The reaction is conducted under an inert atmosphere (e.g. nitrogen). The reaction is preferably conducted by adding the aromatic hydroxy compound or alcohol or mixture thereof to a rapidly stirred mixture of alkali metal, preferably sodium, in the selected hydrocarbon solvent. A particularly preferred embodiment is to add the aromatic hydroxy compound to a rapdily stirred mixture of alkali metal at a temperature above the melt point of sodium (i.e. 97.5° C.). A preferred temperature is about 105°–120° C. If the solvent boils below this temperature an autoclave can be used at autogenous or higher pressures. Autoclave venting may be carried out continuously or intermittently to remove hydrogen formed during reaction of the alkali metal or alkali metal hydride with the aromatic hydroxy compound or alcohol. A turbine type stirrer is preferred and the stirring rate should be sufficient to disperse the melted sodium into the form of very small globules.

The amount of aromatic hydroxy compound or alcohol is preferably sufficient to provide a slight stoichiometric excess of hydroxyl groups over the sodium to ensure that all sodium reacts. Reaction time should be long enough to substantially complete the reaction. This can usually be accomplished in 4–24 hours, more often 8–16 hours.

The amount of hydrocarbon solvent should be sufficient to maintain a stirrable slurry at the completion of the reaction because the alkali metal aryloxide or alkoxide are not soluble in the hydrocarbon solvents. Good results have been achieved at a solids loading of about 11 wt % so a useful range is about 5–20 wt % solids.

The thick white slurry is then ready for the substitution reaction which is conducted in the same type hydrocarbon solvent in which the aryloxide and/or alkoxide substituting agents were made. This reaction can be conducted in the same vessel used to make the aryloxide and/or alkoxide. The chloropolymer is dissolved in the hydrocarbon solvent to form a chloropolymer solution. This solution usually contains about 5–20 wt % chloropolymer. The chloropolymer solution is then added to the alkali metal aryloxide and/or alkoxide slurry. The addition can be all at once or on a larger scale it is more prudent to add the chloropolymer in increments until the reaction subsides. The reaction temperature should be in the range of about 120°–200° C. A more preferred temperature range is about 120°–170° C. and most preferably about 140°–160° C. It has been found that in this range, no solubilizing agents such as quaternary ammonium halides are required and in fact the results are as good without such solubilizing agents as they are with the solubilizing agents. Furthermore, no degradation of the product was observed. With most solvents, including toluene and cyclohexane, the reaction temperature will require that the process be conducted in a sealed pressure resistant vessel under at least autogenous pressure.

The ratio of alkali metal aryloxide and/or alkoxide to chloropolymer should be sufficient to provide about 0.9–1.1 total moles of aryloxide and/or alkoxide per equivalent of replacable chlorides. Large excesses of aryloxide are avoided as the excess ends up as phenol and is difficult to remove from the product.

The substitution reaction is usually complete within about 8 hours so a useful reaction time is about 4–12 hours.

Substituted polyphosphazenes can be recovered by conventional methods. In one method, the resultant reaction mixture is neutralized with an acid, washed with water and precipitated by addition to methanol. The precipitated gum can be redissolved in a solvent and precipitated a second time if more purity is required.

The following examples serve to further show how the process is conducted by way of specific embodiments.

EXAMPLE 1

A solution of 188.3 grams (2 moles) of phenol and 244.5 grams (2 moles) of p-ethylphenol in 819.2 grams of dry toluene was prepared. The solution was stored under a nitrogen atmosphere over 4 A molecular sieves to maintain dryness.

In a pressure resistant reaction vessel was placed 2.53 grams (0.11 mole) of clean sodium and 80 grams of dry toluene. This was heated to 110° C. and stirred until the sodium was completely melted. A turbine type stirrer was used which dispersed the sodium into small globules. Then 35.4 grams (0.1133 mole) of the above phenol solution was added and rinsed into the reaction vessel with 10 grams of toluene.

The temperature at first dropped to 94° C. and then rose rapidly to 123° C. The mixture was stirred overnight at 110° C. Hydrogen gas liberated in the reaction was continuously vented while maintaining a constant internal pressure with nitrogen of 25 psig.

A 9.82 wt % solution of high molecular weight linear chloropolymer in dry toluene was prepared. The chloropolymer was made by polymerizing phosphonitrilic chloride trimer. Then 59.01 grams of this toluene solution was added to the sodium phenoxide slurry in the pressure reaction vessel and rinsed into the vessel with 20 grams of dry toluene.

The vessel was sealed and stirred at 120° C. under a nitrogen atmosphere (25 psig) for 24 hours. The reaction mixture was cooled to ambient temperature and then neutralized with 0.48 mL conc sulfuric acid to a pH 4.0. The mixture was thick so 10 grams additional toluene was added and the solution transferred to a separatory funnel. The reactor was rinsed with 20 grams of toluene which was also added to the separatory funnel. The toluene solution was washed with 50 grams de-ionized water. An emulsion formed. The product was precipitated from the emulsion by adding it to 1200 ml of a 2:1 methanol:water solution. The precipitated polyphosphazene gum was rinsed with methanol and water. The gum was then re-dissolved in toluene to make a 10 wt % solution. This solution was re-precipitated by addition to 3 volumes of methanol. The precipitated polyphosphazene was rinsed again with methanol and dried in a vacuum oven at 50° C. for 16 hours yielding 10.06 grams of dry phenoxide/p-ethylphenoxide substituted polyphosphazene gum. Wet chemical analysis showed less than 0.07 wt % residual chlorine indicating essentially complete substitution.

EXAMPLE 2

In a reaction vessel under a nitrogen atmosphere was placed 2.53 grams of clean sodium and 80 grams of dry toluene. The mixture was heated to 110° C. and stirred using a turbine type dispersing head to form a dispersion. To this was added 35.4 grams of the phenol/p-ethylphenol/toluene solution made up in Example 1. While stirring at 700 rpm the temperature rose rapidly to 109° C. Hydrogen gas liberated in the reaction was continuously vented while maintaining a constant pressure of 25 psig with nitrogen. The reaction was then stirred overnight at 109° C. The reactor was then cooled to 105° C. and 59.01 grams of the 9.82 wt % chloropolymer-toluene solution was added with 20 grams of toluene used to rinse in the residue left in the flask. The reaction vessel was sealed and pressurized to 50 psig with nitrogen and then heated to 150° C. with stirring for 24 hours. An Alliquot of the reaction mixture removed after 8 hours and analyzed by 31 P-NMR showed that the substitution was essentially complete at that time. The mixture was then cooled and neutralized with sulfuric acid to pH 2.0 and the product recovered as in Example 1 yielding 11.6 grams of substituted linear polyphosphazene gum containing only 0.06 wt % residual chlorine.

EXAMPLE 3

A solution of 28.23 grams (0.3 moles) of phenol and 36.65 grams of p-ethylphenol in 122.6 grams of dry cyclohexane was prepared and stored over 4 A molecular sieves under dry nitrogen.

In an autoclave was placed 2.53 grams of clean sodium and 80 grams of dry cyclohexane at 75° C. The autoclave was purged with nitrogen and pressurized to 50 psig with nitrogen. The temperature was raised to 108° C. with stirring to melt the sodium.

Then 35.4 grams of the above cyclohexane-phenolethylphenol solution was transferred to a stainless steel bomb which was pressurized with nitrogen to 65 psig and connected to the autoclave charge port. Phenol/p-ethylphenol solution was transferred to the autoclave. The bomb was rinsed with 10 grams cyclohexane which was also transferred to the autoclave. The temperature of the stirred mixture in the autoclave dropped to 88° C. and then rose rapidly to 100° C. The mixture was stirred overnight at 108° C. with continuous venting of hydrogen gas liberated in the reaction.

The autoclave was then cooled to 75° C. and vented. Then 43.37 grams of a 13.33 wt % chloropolymer solution in cyclohexane was added. The autoclave was sealed and pressurized to 140 psig with nitrogen and then heated to 150° C. It was stirred at 150° C. for 24 hours. The mixture was then cooled and neutralized with 1.7 grams conc sulfuric acid to a pH of 3.0. The mixture was transferred to a separatory funnel and washed with 150 grams of water. An emulsion formed. An additional 100 ml of saturated brine was added to aid in phase separation, and a static discharge electrode was used to break the emulsion. The water phase was removed and the organic phase was precipitated by addition to four volumes of methanol. The precipitated polyphosphazene gum was washed twice with methanol and then re-dissolved in cyclohexane. It was again precipitated by addition to three volumes (450 ml) of methanol and the gum again rinsed two times with methanol and dried in a vacuum oven at 55° C. yielding 8.9 grams of a phenoxide/p-ethylphenoxide substituted polyphosphazene gum analyzing only 0.08 wt % residual chlorine.

Substituted polyphosphazenes made by the present process are useful for all the same utilities of prior art polyphosphazenes including o-rings, seals, non-flammable non-smoking foams, medical devices, body implants, wire and cable insulation and jacketing, and the like.

I claim:

1. A process for replacing the chloride substituents on a phosphonitrilic chloride polymer with an aryloxide or alkoxide group in a single liquid reaction medium, said process comprising heating a mixture of said phosphonitrilic chloride polymer and at least 0.9 moles per equivalent of replaceable chloride in said phosphonitrilic chloride, of an alkali metal aryloxide, alkoxide or mixture thereof in a liquid hydrocarbon reaction medium in which said alkali metal aryloxide and alkoxide are substantially insoluble and in which the resultant substituted polymer is soluble, said heating being at a temperature of about 120°–200° C. for a period of time sufficient to obtain a substantial amount of substituted polymer.

2. A process of claim 1 wherein said phosphonitrilic chloride polymer is a high molecular weight substantially linear polymer.

3. A process of claim 2 wherein said alkali metal is sodium.

4. A process of claim 3 wherein said substituting agent is a sodium aryloxide or a mixture of sodium aryloxide and sodium alkoxide including substituted aryloxides and alkoxides.

5. A process of claim 3 wherein said liquid hydrocarbon is a cycloaliphatic hydrocarbon.

6. A process of claim 5 wherein said cycloaliphatic hydrocarbon is cyclohexane.

7. A process of claim 6 wherein said temperature is 120°14 170° C.

8. A process of claim 7 wherein said substituting agent comprises a mixture of sodium phenoxide and sodium alkylphenoxides.

9. A process of claim 8 wherein said substituting agent comprises a mixture of sodium phenoxide and sodium para-ethylphenoxide.

10. A process of claim 7 wherein said substituting agent comprises a mixture of sodium phenoxide, sodium para-ethylphenoxide and sodium ortho-allylphenoxide.

11. A process of claim 7 wherein said substituting agent comprises a mixture of sodium aryloxide, sodium substituted aryloxide and sodium alkoxides.

12. A process of claim 11 wherein said substituting agent comprises a mixture of sodium phenoxide, sodium alkylphenoxide and sodium alkoxide.

13. A process of claim 12 wherein said substituting agent comprises a mixture of sodium phenoxide, sodium para-ethylphenoxide and sodium alkoxide.

14. A process of claim 3 wherein said liquid hydrocarbon is an aromatic hydrocarbon.

15. A process of claim 14 wherein said aromatic hydrocarbon is toluene.

16. A process of claim 15 wherein said temperature is about 120°–170° C.

17. A process of claim 16 wherein said substituting agent comprises a mixture of sodium phenoxide and sodium alkyl phenoxide.

18. A process of claim 17 wherein said substituting agent comprises a mixture of sodium phenoxide and sodium paraethylphenoxide.

19. A process of claim 17 wherein said substituting agent comprises a mixture of sodium phenoxide, sodium alkylphenoxide and sodium ortho-allylphenoxide.

20. A process of claim 16 wherein said substituting agent comprises a mixture of sodium aryloxides, sodium substituted aryloxides and sodium alkoxides.

21. A process of claim 20 wherein said substituting agent comprises a mixture of sodium phenoxide, sodium alkylphenoxide and sodium alkoxide.

22. A process of claim 21 wherein said substituting agent comprises a mixture of sodium phenoxide, sodium para-ethylphenoxide and sodium alkoxide.

23. A process of claim 22 wherein said substituting agent comprises a mixture of sodium phenoxide, sodium paraethylphenoxide, sodium alkoxide and sodium ortho-allylphenoxide.

24. A process of claim 1 wherein said alkali metal aryloxide and alkoxide are selected from unsubstituted and substituted aryloxides and alkoxides wherein the substituents are selected from alkoxy, halogen, alkyl, trifluoromethyl and allyl.

* * * * *

UNITED STATES PATENT AND TRADEMARK OFFICE
CERTIFICATE OF CORRECTION

PATENT NO. : 4,514,550
DATED     : APRIL 30, 1985
INVENTOR(S) : HAROLD R. PENTON

It is certified that error appears in the above-identified patent and that said Letters Patent is hereby corrected as shown below:

Column 2, line 31, reads " —PNCl$_2$— " and should read -- —[—PNCl$_2$—]— --.

Column 7, line 12, reads "120°14 170°C" and should read -- 120-170°C --.

Signed and Sealed this

Twenty-seventh Day of August 1985

[SEAL]

Attest:

DONALD J. QUIGG

*Attesting Officer*    *Acting Commissioner of Patents and Trademarks*